United States Patent Office 3,808,158
Patented Apr. 30, 1974

3,808,158
AMPHOTERIC THERMALLY REGENERABLE
ION EXCHANGE RESINS
Brian Alfred Bolio, 33 Somers St.,
Mitcham, Victoria, Australia
No Drawing. Filed July 20, 1972, Ser. No. 273,429
Claims priority, application Australia, July 20, 1971,
5,620/71
Int. Cl. C08f 15/02, 15/40
U.S. Cl. 260—2.1 R                        18 Claims

ABSTRACT OF THE DISCLOSURE

Amphoteric, thermally regenerable, ion-exchange resins are produced by simultaneously polymerizing acidic and basic monomers in a homogenous solvent system and in the presence of counter-ions which associate with the anionic and cationic moieties of the monomers more strongly than such moieties associated with each other. Typically such resins have a thermally-regenerable ion-exchange capacity of at least 0.4 meq./gm. and a half-time for salt uptake of not more than 5 minutes.

This invention is concerned with thermally regenerable ion-exchange resins which have both acidic and basic ion-exchange sites. Such "amphoteric" resins may be formed as a composite of acidic and basic ion-exchange sub-particles or moieties in an ion-permeable matrix, as a true copolymer, as a resin comprising an interlocked mixture of at least two polymers—such as the so-called "snake-cage" polymers—or as a resin comprising a mixture of these two types of structures in the one composition having these desired ion-exchange properties.

Thermally regenerable resins have a potentially important application in water demineralization processes (see our prior Australian Pat. No. 274,029) because low-grade heat can be efficiently employed for regeneration. But such resins are of the weak-acid/weak-base type and have such inherently slow rates of salt uptake that their use in conventional mixed-bed systems is impractical for large-scale water treatment. As it would be expected that smaller acidic and basic particles and closer particle spacing should greatly improve the rate of ion-exchange, attempts have been made to produce amphoteric resins having acidic and basic moieties; but, although the ion-exchange rates can be high, all such polymers known to the applicant have a thermally regenerable ion-exchange capacity of no more than a few percent of the chemically regenerable total capacity, and certainly below 0.2 meq./gm., which renders them quite impractical for water demineralization.

Thus, while the amphoteric materials described in U.S. Pat. 3,351,549 issued to H. S. Bloch can be designed to provide fast adsorption rates in water treatment, the ion-exchange capacities of such systems are generally very low. These materials are therefore not of practical use in large-scale water-treatment.

One attempt to avoid these difficulties is described in our copending patent application, now U.S. Pat. 3,645,-922 which discloses a particulate amphoteric ion-exchange resin in which minute but discrete particles of ion-exchange resins are incorporated in an ion-permeable matrix. Though the ion-exchange rates of such "plum-pudding" resins are considerably inferior to the amphoteric polymers previously mentioned, the thermally regenerable capacities are superior, and the overall kinetics are much better than those of the conventional mixed bed.

Broadly, therefore, this invention seeks to provide an amphoteric, thermally regenerable ion-exchange resin having improved rates of salt adsorption. More particularly, but not essentially, the invention seeks to provide such a resin and a way of making it so that the resin will be of value in water-treatment processes.

This invention is based upon the realization that the ion-exchange rates of plum-pudding resins are probably limited by the rate of proton transfer between acidic and basic sites, even where the dimensions of the ion-exchange particles and their spacing is of the order of microns; and that the ion-exchange capacity of an amphoteric polymer is probably limited by self-neutralization, that is pairing of moieties of opposite polarity within the polymer itself. Thus, very close spacing of acidic and basic moieties is highly desirable but the tendency for self-neutralization must be minimized. Moreover, it is also appreciated that self-neutralization probably takes place to a large degree in the constituent acidic and basic components of the system before or during the formation of the final polymeric structure.

Accordingly, therefore, the present invention seeks to avoid such self-neutralization by a process which involves the simultaneous polymerization of acidic and basic monomers in a homogeneous solvent system and in the presence of counter-ions which will preferentially associate with the acidic and basic sites of the monomers so that these sites will be less likely to associate with one another while the resin structure is being formed. After the sites have been fixed within the structure by polymerization, the counter-ions can be removed to expose the sites for ion-exchange purposes. In this way, a distribution of the charged sites within the final polymer structure is favored, in which self-neutralization within the structure by systematic pairing of such sites prior to or during polymerization, or upon subsequent removal of the ions, is minimized. Some self-neutralization and, perhaps, some permanent site blockage will take place, but it has been found that the effective capacity for thermally regenerable ion-exchange (i.e. the number of sites available after thermal regeneration) can be made very much greater than previously possible with amphoteric resins.

More particularly, the method of the present invention involves the simultaneous polymerization of acidic and basic monomers in a solution containing counter-ions which associate more strongly with the anionic and cationic moieties of the monomers than such moieties associate with one another.

The monomers chosen for the preparation of the resins in accordance with the present invention may be, typically, those known in the art to be suitable for the production of thermally regenerable ion-exchange resins. The basic sites may, for example, be derived from any weakly basic groups, such as substituted amines, preferably ethylencially substituted amines such as allylamines and especially triallylamine; similarly, acidic sites may be those derived from unsaturated carboxylic acid containing groups such as acrylic acid and methacrylic acid. Other monomers which would be suitable for resins of this type include basic monomers such as N-alkyl-ethyleneimines, dimethylaminoethyl acrylate or methacrylate, t-butylaminoethylacrylate or methacrylate and acidic monomers such as maleic anhydride, vinylacetic acid, allylacetic acid, and the like. Where a mixture does not contain monomers capable of forming three-dimensional cross-linked structures, it is necessary to add a crosslinking agent such as ethylene glycol dimethacrylate or divinylbenzene.

As indicated above, the polymerization is carried out in a medium which will dissolve the counter-ion source compounds and the monomer components. In accordance with this invention, it is preferable to employ an aqueous solvent system. Where solubility of the counter-ion compounds and monomers is not a limitation, it has been found that the thermally regenerable ion-exchange capacity of the resultant resins tends to increase with the percentage of water in the solvent. Preferably, not less than 10 to 25% of water should be employed in the solvent system, but a non-aqueous solvent such as dimethylformamide is suitable as a secondary component for the solvent system. Other components of the solvent system will be evident to those skilled in the art, depending on the solubility of the monomers employed and the compounds providing the counter-ions. There is an improvement in the thermally regenerable ion-exchange capacity ("effective capacity") with increasing water content in the solvent but, in general, solvent systems having more than 90% water result in the production of excessively soft resins and, for optimum results, between 20 and 80% water should be employed. An increase in the concentration of counter-ions in the reaction mixture results in resins of higher effective capacity.

The counter-ions may be introduced into the solution as a salt, or base plus acid. In some cases, a base or acid is used together with a salt. They should be present in at least stoichiometric quantities in relation to the oppositely charged monomeric sites present, though the highest possible ratio of counter-ion to monomer, consistent with maintaining a homogeneous solution, is desirable. Generally, the more highly charged counter-ions are the more effective as they associate more strongly with the oppositely charged ion-exchange sites, but such ions are not always compatible with the system in that, in order to maintain a homogeneous solution, the pH may be displaced from the optimum for polymerization.

Simple inorganic ions have been found to be most effective, both in terms of their ability to prevent self-neutralization and their ease of removal after polymerization. Multivalent ions are preferred, especially the $SO_4^{--}$, $Mg^{++}$, $Ca^{++}$, $Sr^{++}$, $Ba^{++}$, $Zn^{++}$ and $Mn^{++}$ ions, though improvements are obtainable with monovalent counter-ion systems. With $SO_4^{--}$ it has been found difficult to keep the pH of the reaction mixture sufficiently high because of phase separation, but this problem may be overcome by using $SO_4^{--}$ in conjunction with other counter-ions such as $Cl^-$. Good results are also obtained where multi-charged counter-ions of one polarity are employed with singly charged counter-ions of the other polarity; thus the combination of $Ca^{++}$, $Sr^{++}$, $Ba^{++}$, $Zn^{++}$, or $Mn^{++}$ with $Cl^-$ or the combination of $SO_4^{--}$ and $Na^+$ has been found satisfactory. In addition to the cations mentioned above, $Li^+$, $K^+$, $Cs^+$, $NH_4^+$ may be employed as singly charged members.

Organic cations which are more organophilic than the correspondingly charged monomer are generally useful as counter-ions, though such cations should not be so organophilic as to be difficult to subsequently remove from the resin; similarly, they should not be so large as to be trapped sterically within the resin. Thus, while many quaternary ammonium ions have been found to be of little value, the organophilic cation

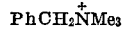

competes very effectively against ions of triallylamine (TAA) monomers for the negatively charged sites of the acidic monomer. Though it is necessary to degrade the organic cations first, in order to facilitate their removal from the resin after polymerization, these positively charged organic counter-ions can be effective in preventing self-neutralization. Organic anions may also be employed as counter-ions in accordance with this invention; for example, $HCOO^-$, $CH_3COO^-$ and the like. Aliphatic carboxylate anions of 1 to 8 carbon atoms, in particular acetate, propionate and valerate ions can be usefully employed, though it has been found that the formate ion is of little value as a counter-ion in most of the polymer systems investigated. Of course, organic and inorganic counter-ions may be used together at the one time, an effective combination being, for example,

with $Cl^-$ for amphoteric resins made from methacrylic acid (MAA) and TAA.

It will be appreciated by those skilled in the art that polymerization should be brought about in a way which does not interfere with the action of the counter-ions being employed and, to a large extent, this is a matter of the influence of pH on the counter-ion function and on the polymerization process. Generally speaking, however, the pH, temperature and other conditions associated with the polymerization process may be those known in the art for the polymerization of the appropriate monomers concerned. Because of the lack of interference with the counter-ion action, radiation-initiated polymerization is particularly convenient, especially with MAA/TAA and similar monomers. Nevertheless, monomers have been successfully polymerized by the use of potassium persulphate to yield a resin with analogous properties to those of essentially the same resin prepared in the same way but employing gamma radiation for polymerization. Since aqueous solvent systems are preferred, water soluble initiators of various sorts, such as cumene hydroperoxide and various other redox systems such as $K_2S_2O_8/K_2S_2O_5$ and cumene hydroperoxide/$FeSO_4$ may be employed.

Preferably, the pH of the system at the time of polymerization should be selected so that both monomers are largely ionized and polyerization of the individual monomers and reaction between them is facilitated. Normally, this will involve some degree of compromise; for example, the optimum polymerization pH for TAA is approximately 5.4 whereas, with MAA, the rate of polymerization falls off with increasing pH from pH 2.5 to reach a minimum at pH 7, but pH 5 was found to be suitable for the formation of the amphoteric resin. As mentioned previously, the choice of solvent system also has an influence on the pH which will be chosen for polymerization but, generally speaking, the polymerization pH will be found to lie between 3.5 and 6.8, though some combinations of monomers and counter-ion will require the polymerization pH to lie outside this range.

To some extent, another factor influencing polymerization pH conditions is the choice of monomer ratios. While it will be usual to attempt to make the number of acidic and basic sites in the product resin approximately equal, the optimum ratio from the standpoint of the ion-exchange process may not be 1:1 as explained in our above-mentioned Australian patent. Generally, the effective capacity of amphoteric resins produced in accordance with the present invention appears to fall off sharply as the monomer ratios depart from the range 1:2 to 1:0.5 and the polymerization conditions are not unduly affected by monomer ratios within this range.

It will be appreciated by those skilled in the art that the solvent and monomer systems referred to above concern the components which are actively involved in the production of the desired amphoteric resins; whether the resins are produced in bulk or particulate form can be determined by the use of a secondary liquid phase which need not include any reacting components but merely makes it possible to disperse the aqueous reaction mixture in a water-immiscible supporting medium. In this way, the product can be made in the form of particulate bead-like material having particle size which makes it suitable for use in mixed-bed ion-exchange columns. Resins produced in bulk, however, may be ground to a similar size range for this purpose.

It will also be appreciated that the steps by which the product is formed are capable of considerable variation; it is possible, for example, to first dissolve one of the monomers in salt form in the solvent so that the monomer is ionized and the salt-forming ions act as counter-ions; the second monomer may be added with associated counter-ions and polymerization carried out. On the other hand, both free acid and free base forms of the monomers and counter-ions may be added in a single step, or in successive steps—component by component—prior to polymerization. In some cases it may be advantageous to partially polymerize one of the monomers before the other monomer is added, provided that the counter-ions are added at a time which will ensure that self-neutralization will be obviated. The methods by which most counter-ions can be removed from the product resin will, in general, be known to those skilled in the art. With the simple inorganic counter-ions this may be effected by a simple sequence of alkali and acid washes. The first wash with sodium hydroxide displaces the negative counter-ions and converts the basic sites largely to their undissociated form. The second wash with hydrochloric acid displaces the positive counter-ions and converts the acidic sites to the free-acid form, while at the same time the basic sites are converted to the hydrochloride form. The excess acid is removed by washing the resin with water. In some instances a straightforward water wash, preferably hot, will achieve the desired result over a longer period. With the larger organic counter-ions, similar washing techniques may be employed, but those which are more difficult to dislodge may have to be broken down on site and removed in sub-units by a preliminary treatment with hot alkali or other reagent. In some instances, other treatments may result in a greater number of sites becoming available, including the use of hot acid or alkali.

Following polymerization and washing, it is preferable to subject the product resin—preferably in particulate form—to a pH equilibration treatment to achieve the optimum ion-exchange performance. Normally, this simply involves stirring the resin in an aqueous salt solution at room temperature (ca. 20° C.) and adding sodium hydroxide until the desired pH level is obtained, care being taken to ensure that the final equilibrium salt concentration is at the required level. The salt concentration employed is that of the water to be treated by the desalination process. The resin is now suitable for use in column operation of a thermally regenerable process, as described in our prior Australian Pat. No. 274,029. For purposes of evaluation, however, the resin may be washed with hot water at ca. 80° C. to obtain it in a regenerated form, and the amount of salt taken up by stirring the regenerated resin in salt solution at room temperature used as a measure of the effective capacity of the system. The time necessary to achieve salt uptake equivalent to 50% of the equilibrium level (the "half time") may be used as a convenient measure of the rate of salt adsorption.

Finally, it will be appreciated that the amphoteric resins formed in accordance with the present invention must differ from similar amphoteric resins formed without the used of counter-ions because self-neutralization must involve association of oppositely charged sites which, from the steric or structural standpoint, defines a resin which is significantly different from one where self-neutralization has been prevented and the sites are randomly disposed within the structure. However, while this difference in structure is difficult to define by chemical or physical analysis, a ready indicator is provided by the significantly increased effective ion-exchange capacity. Therefore, the present invention also includes a novel thermally regenerable ion-exchange resin formed by the simultaneous polymerization of at least one weakly basic with at least one weakly acidic monomer and characterized in that said resins have significant thermally regenerable ion-exchange capacity, preferably greater than 0.4 meq./gm. with a high rate of salt uptake—preferably having a half time of not more than 5 minutes. As previously indicated, the invention seeks to provide resins of use in the large-scale treatment of water, particularly desalination. In this connection, it has been found that the resins have the ability to shed divalent ions such as $Ca^{++}$, $Mg^{++}$ and $SO_4^{--}$ adsorbed from the water. This is an important property for water-treatment resins as divalent-ion fouling is normally a serious problem:

In order to further portray the nature of the present invention, a number of particular examples will be given to illustrate the preparation and performance of thermally regenerable ion-exchange resins formed in accordance with the principles above described.

EXAMPLE 1

Preparation and properties of an amphoteric resin based on acrylic acid and triallylamine, polymerized in the presence of sodium, chloride, and sulphate ions A resin was prepared from an equimolar mixture of sodium acrylate and triallylamine hydrochloride, but it was first necessary to acidify with sulphuric acid to prevent the formation of two liquid phases.

Glacial acrylic acid (2.4 ml., 35 meq.) was neutralized with 6 N sodium hydroxide (6 ml., 36 meq.), the mixture being kept at ice temperature during this operation. A 75% solution of triallylamine hydrochloride (8.3 ml., 35 meq.) was added, when some of the free-base form of the amine separated out as an oil. A homogeneous solution was obtained by the addition of ice-cold sulphuric acid (0.5 ml., 18 meq.), with the precipitation of some solid sodium sulphate. After filtration, a clear solution of pH 5.8 was obtained. It was vacuum degassed to remove oxygen and polymerized by irradiation at room temperature to a total dose of 10 mrad., by exposure to a $Co^{60}$ source. The hard, almost transparent mass which resulted was broken up into 16–60 Tyler mesh particles. The resin was extracted with alcohol in a Soxhlet apparatus to remove soluble organic material, and column washed with 0.3 N alkali, 2 N hydrochloric acid, and water, using 20 bed volumes of the washing solution in each case.

After equilibration in 1000 p.p.m. salt solution to a pH of 7.2, the resin was regenerated by washing it in a jacketed column with distilled water at 80° C. until the effluent was chloride-free. The rate of salt uptake and effective capacity of the dried resin were then measured on the 16–35 Tyler mesh fraction by determining the amount of salt it adsorbed at ambient temperature (ca. 20° C.) from 0.02 N saline, the change in solution concentration as a function of time being measured by a conducti-metric method. A half time of 2 min. and an effective capacity of 0.58 meq./g. (0.13 meq./ml.) were obtained.

A resin was similarly prepared from the free acid and free base forms of the monomers, without the addition of other ions.

Glacial acrylic acid (2.4 ml., 35 meq.) was mixed at ice temperature with triallylamine (6.1 ml., 35 meq.) to give a clear solution of pH 6.1. After vacuum degassing, the solution was polymerized with a gamma ray dose of 10 mrad. The opaque resin which resulted crumbed readily and was broken down into 16–60 Tyler mesh particles. The resin was washed, equilibrated in salt solution, and thermally regenerated as before. It had a negligible effective capacity, a fact which is attributed to self-neutralization between oppositely charged sites within the resin.

A comparison of the data obtained from the resin prepared in the presence of sodium, chloride, and sulphate ions with resins of the plum-pudding type described in our copending patent application, now U.S. Patent 3,645,922, of the snake-cage and amphoteric type, and a normal mixed bed of commercial resins is shown below.

| Resin, 16-35 Tyler mesh | Effective capacity, meq./g. | Half time, min. |
|---|---|---|
| 1(a) Present example | 0.58 | 2 |
| (b) Plum-pudding resin ("De-Acidite" G/"Zeo-Karb" 226 in PVA matrix) | 0.66 | 25 |
| (c) Snake-cage resin (De-Acidite" G/polyacrylic acid) | 0.04 | 4 |
| (d) Amphoteric resin (made from chloromethylated polystyrene and isonipecotic acid) | 0.02 | |
| (e) Mixed bed ("De-Acidite" G/"Zeo-Karb" 226) | 1.1 | (¹) |

¹ Very high—greater than 500.

NOTE.—"De-Acidite" and "Zeo-Karb" are trade names for resins manufactured by the Permutit Company, London.

It can be seen that the resin described in this Example 1(a) has an effective capacity only slightly lower than that of a plum-pudding resin (b), but its rate of salt adsorption is much faster because of the closer proximity of the ion-exchange sites. The snake-cage resin (c) also adsorbs salt very rapidly, but its effective capacity is extremely low. This is ascribed to self-neutralization occurring between the acidic and basic sites within the resin. Likewise the amphoteric resin made from chloromethylated polystyrene and isonipecotic acid (d), which is an example of the products claimed in U.S. Pat. 3,351,549 in that the amino and acid groups are situated on a structure in which there is one carbon atom separating the carbon atoms bearing the amino and acid groups, reacts rapidly with salt but has a very low effective capacity because of the self-neutralization effect. Such internal neutralization has been avoided to a large extent in the resin whose preparation in the presence of counter-ions is described in this example. The normal mixed bed of commercial resins (e) has the highest effective capacity of these resins, but its rate of salt uptake is many times slower.

EXAMPLE 2

Column operation of the thermally regenerable process

Column operation demonstrating a thermally regenerable system was carried out with the amphoteric resin whose preparation in the presence of counter-ions was described in the preceding example. The resin was equilibrated in 1000 p.p.m. saline to a selected pH value and packed in a column where cold (ca. 20° C.) and hot (ca. 80° C.) solutions of 1000 p.p.m. saline were alternatively passed through the bed of resin at a flow rate of 2 gal./cu. ft./min. Salt was adsorbed during the cold cycle, and released during the hot cycle. The operation was carried out by the method described in Australian Pats. Nos. 274,029 and 295,961 and as described therein the performance of the resin varied with the pH of the system, with the best result being obtained in the pH range 7.2 to 7.9. The comparison is made in terms of the effective capacity, which is shown as the mean of the effective capacity obtained in adsorption and regeneration cycles.

| Equilibration, pH: | Effective capacity, meq./ml. |
|---|---|
| 6.4 | 0.034 |
| 7.2 | 0.090 |
| 7.9 | 0.092 |

The results obtained may be compared with the optimum effective capacity of 0.036 meq./ml. found for a plum-pudding resin in column operation, but at the lower flow rate of 0.6 gal./cu. ft./min., with similar performance at flow rates up to 1.3 gal./cu. ft./min., as disclosed in our Australian patent application, now U.S. Pat. 3,645,922. The higher flow rate of 2 gal./cu. ft./min. used in the present example is made possible by the faster rates of salt uptake exhibited by amphoteric resins prepared in the presence of counter-ions.

Column runs have also been carried using waters containing calcium and sulphate ions as well as sodium and chloride ions. When a water containing 136 p.p.m. calcium sulphate and 1100 p.p.m. sodium chloride was used as the feed in the cold cycle, and a water containing 500 p.p.m. sodium chloride was used as the feed in the hot cycle, the following results were obtained.

| | Effective capacity (meq./ml.) for— | |
|---|---|---|
| Equilibration, pH | Na⁺ and Ca⁺⁺ | Ca⁺⁺ |
| 6.4 | 0.030 | 0.005 |
| 7.3 | 0.072 | 0.009 |
| 8.0 | 0.062 | 0.007 |

This experiment demonstrates the use of our improved resin in the treatment of waters containing divalent ions in the proportions found in many naturally occurring bore and surface waters. The reproducibility of the column operation over many cycles shows that the resin reversibly adsorbs and releases calcium and sulphite ions with no buildup occurring in the resin after prolonged operation. The product from the cold cycle is considerably denuded of ions, whereas the effluent obtained from the hot cycle becomes more concentrated, the results for operation at an equilibration pH of 7.3 being as below.

| | Product concentration, p.p.m. | | Effluent concentration, p.p.m. | |
|---|---|---|---|---|
| Dissolved salt | Maximum | Mean | Maximum | Mean |
| NaCl | 220 | 380 | 2,000 | 1,250 |
| CaSO₄ | 0.1 | 4 | 120 | 100 |

EXAMPLE 3

Preparation and effective capacity of an amphoteric resin based on methacrylic acid and triallylamine, polymerized in the presence of sodium, calcium, and chloride ions A resin was prepared with calcium chloride present in the reaction mixture. In order to maintain homogeneity of the mixture the acid monomer was initially half neutralized with sodium hydroxide.

Glacial methacrylic acid (3 ml., 35 meq.) was cooled in ice and mixed with 6 N sodium hydroxide (3 ml., 18 meq.) and 75% triallylamine hydrochloride (5.5 ml., 23 meq.). A solution of calcium chloride (2 g., 35 meq.) in water (5 ml.) was added. The further addition of water (20 ml.) yielded a clear solution of pH 4.5. After vacuum degasing it to remove oxygen, the solution was irradiated at room temperature to a total dose of 10 mrad. using gamma rays from a Co⁶⁰ source. The opaque solid which resulted was broke nup into 16–60 Tyler mesh particles, extracted with alcohol in a Soxhlet apparatus, and column washed with 0.3 N alkali, 2 N hydrochloric acid, and water, using 20 bed volumes of the washing liquor in each case.

The resin was equilibrated in 1000 p.p.m. saline to a pH level of 6.2. After thermal regeneration with distilled water at 80° C., the effective capacity of the resin was measured by determining the amount of salt it adsorbed at room temperature (ca. 20° C.) from a solution of 0.02 N saline. A value of 0.45 meq./g. was obtained.

EXAMPLE 4

Preparation and effective capacity of an amphoteric resin based on methacrylic acid and triallylamine, polymerized in the presence of benzyltrimethylammonium and chloride ions A resin was prepared with a quaternary ammonium chloride present in the reaction mixture. The quaternary ammonium ion was removed from the final ion exchanger by degradation with alkali and subsequent extraction with alcohol.

Glacial methacrylic acid (3 ml., 35 meq.) was cooled in ice and neutralized with 40% benzyltrimethylammonium hydroxide (14.6 ml., 35 meq.) to form a solution of benzyltrimethylammonium methacrylate. A 75% solution of triallylammonium chloride (5.5 ml., 23 meq.) was added to the ice-cold solution; a small amount of the free base form of triallylamine separated out as an oil. A homogeneous solution was obtained by the addition of hydrochloric acid, until the pH of the reaction solution was 5.4. After vacuum degassing the solution to remove oxygen, it was irradiated at room temperature to a total dose of 10 mrad. by means of gamma rays from a $Co^{60}$ source. The opaque solid mass which resulted was broken up into 16–60 Tyler mesh particles which were stirred in 2 N alkali (100 ml.) at 80° C. for 2 hours. The resin was extracted with alcohol in a Soxhlet apparatus, and column washed with 0.3 N alkali, 2 N hydrochloric acid, and water.

After equilibration in 1000 p.p.m. salt solution to a pH of 6.2, the resin was regenerated by washing it with distilled water at 80° C. The effective capacity of the dried resin was then measured by determining the amount of salt it adsorbed at ambient temperature (ca. 20° C.) from 0.02 N saline. The value obtained was 0.47 meq./g.

EXAMPLE 5

Preparation and effective capacity of an amphoteric resin based on acrylic acid and triallylamine, polymerized in the presence of sodium, potassium, chloride and persulphate ions (a) A resin was prepared by bulk polymerization in the presence of sodium and chloride ions, and with chemical initiation of the polymerization using potassium persulphate as the initiator. Sulphate ions were also present from the thermal degradation of persulphate ions.

Glacial acrylic acid (2.4 ml., 35 meq.) was cooled in ice and partly neutralized with 6 N sodium hydroxide (5 ml., 30 meq.). To the mixture was added 75% triallylamine hydrochloride (8.3 ml., 35 meq.), when a clear solution of pH 5.8 was obtained. Potassium persulphate (0.5 g.) was dissolved in the solution, which was then heated to 80° C. and kept at that temperature for a total period of 3 hr. The brown product was broken up into 16–60 Tyler mesh particles and washed with hot alcohol, 0.3 N alkali, 2 N hydrochloric acid, and water in the manner described in the preceding examples.

The particles were equilibrated in 1000 p.p.m. saline to a pH level of 7.2. After thermal regeneration of the resin, its effective capacity was determined by the usual method and found to be 0.20 meq./g.

(b) The same resin may be prepared in bead form by dispersing the aqueous reaction mixture in paraffin oil and polymerizing the droplets containing the reactants by heating the suspension.

Glacial acrylic acid (12.9 ml., 188 meq.) was partly neutralized at ice temperature with 6 N sodium hydroxide (26.7 ml., 160 meq.), and 75% triallylamine hydrochloride (43.0 ml., 186 meq.) was added to the mixture. The pH of the resulting clear solution was 5.7. Potassiumpersulfate (2.6 g.) was dissolved in the mixture, and the aqueous solution was dispersed in paraffin oil (400 ml.) by stirring at 400 r.p.m. with a fixed-blade stirrer of propellor shape. The suspension was heated to 80° C., when it then became necessary to increase the stirring rate to 700 r.p.m. to obtain the aqueous droplets in a suitable size range. The suspension was heated for a total period of 75 min. The solid beads were then filtered off and washed on a Büchner funnel with hexane, followed by acetone, using three alternating washes with each solvent. The usual alkali, acid, and water washes followed, and after equilibration and thermal regeneration as outlined above, the beads were found to have an effective capacity of 0.20 meq./g.

EXAMPLE 6

Preparation of an amphoteric resin based on methacrylic acid, dimethylaminoethyl methacrylate, and ethyleneglycol dimethacrylate, polymerized in the presence of sodium, chloride, and sulphate ions A resin was prepared much as described in Example 1 except that dimethylaminoethyl methacrylate was used as the amine monomer in lieu of triallylamine. Since this amine monomer does not form crosslinked structures, it was necessary to add a crosslinking agent in the form of ethyleneglycol dimethacrylate. The acid monomer used in this example was methacrylic acid, not acrylic acid as in Example 1.

Glacial methacrylic acid (3.7 ml., 44 meq.) was neutralized with 6 N sodium hydroxide (7.3 ml., 44 meq.) at ice temperature. To the cold solution was added 5 N hydrochloric acid (2 ml., 10 meq.) and 5 N sulphuric acid (2 ml., 10 meq.). To this mixture was added a solution of ethyleneglycol dimethacrylate (1.15 ml.) in dimethylaminoethyl methacrylate (7.3 ml., 44 meq.). Two liquid layers formed, and it was necessary to add dimethylformamide (10 ml.) to obtain one liquid phase. Crystals of inorganic material separated out, and these were removed by filtration. The clear filtrate had a pH level of 8.2. After vacuum degassing solution, it was irradiated to a total dose of 10 mrad. from a $Co^{60}$ source. The clear solid which resulted was ground into suitably sized particles and washed in the manner described in Example 1.

EXAMPLE 7

Influence of the preparation of water in the polymerization solvent

Resins were prepared as described in Example 1 except that no sulphate ions were present and the monomers were mixed as the free acid and free base forms, with the counter-ions added as sodium chloride. The acidification step, if necessary, was carried out with hydrochloric acid. The water content of the aqueous dimethylformamide employed as a solvent was raised, and its influence on the effective capacity of the product resin found to be as follows, for resins equilibrated at pH 7.2.

| Polymerization pH | Water content of aqueous dimethylformamide used as solvent, vol. percent | Effective capacity (ca. 20–80° C.) meq./g. |
| --- | --- | --- |
| 6.4 | Nil | Nil |
| 6.6 | 9 | Nil |
| 6.7 | 20 | 0.30 |
| 5.6 [1] | 100 | 0.36 |

[1] Prepared exactly as in Example 1 except that acidification was with hydrochloric acid.

EXAMPLE 8

Influence of salt concentration

Resins prepared by the method of Example 1 but in the absence of sulphate ions, the acidification step being carried out with hydrochloric acid, were prepared with and without the addition of extra sodium chloride, the polymerization pH being 4.0. The higher salt concentration yielded a resin with an improved effective capacity because of the greater number of counter-ions available, as shown below for resins equilibrated at pH 7.2.

| Ion concentration, meq./ml. | | Effective capacity, meq./g. |
| --- | --- | --- |
| Sodium | Chloride | |
| 0.84 | 1.3 | 0.20 |
| 4.8 | 5.3 | 0.29 |

EXAMPLE 9

Influence of sulphate ion as a counter-ion

Resins were prepared as described in Example 1, with either sulphuric acid or hydrochloric acid being used in the acidification step, so that some resins had chloride ion as the negative counter-ion present during polymerization, and some had both chloride and sulphate ions present. The polymerization pH was 5.3–5.8. In all cases sodium ion was present as the positive counter-ion. The results show the advantage of having the doubly charged sulphate ion present during polymerization. The equilibration pH was 7.2.

| Acid monomer | Negative counter-ions | Monomer mold ratio, $RCO_2H/TAA$ | Effective capacity (ca. 20–80° C.) meq./g. |
|---|---|---|---|
| AA | $Cl^-$ | 1:1 | 0.36 |
| AA | $Cl^-, SO_4^{--}$ | 1:1 | 0.58 |
| MAA | $Cl^-$ | 1:2 | 0.20 |
| MAA | $Cl^-, SO_4^{--}$ | 1:2 | 0.46 |

EXAMPLE 10

Effect of multi-charged ions as counter-ions

Resins were prepared by a variety of methods to illustrate the use of multi-charged counter-ions, used in conjunction with a singly charged counter-ion of the opposite polarity. Methacrylic acid and triallylamine were the monomers employed, in a mole ratio of 1:0.67. The results obtained using an equilibration pH of 6.2 are shown below.

| Preparative method | Positive counter-ions | Negative counter-ions | Polymerization pH | Effective capacity (ca. 20–80° C.) meq./g. |
|---|---|---|---|---|
| A | Nil | Nil | 5.3 | Nil |
| B | $Na^+, Mg^{++}$ | $Cl^-$ | 3.8 | 0.20 |
| B | $Na^+, Ca^{++}$ | $Cl^-$ | 4.5 | 0.45 |
| B | $Na^+, Sr^{++}$ | $Cl^-$ | 5.0 | 0.23 |
| B | $Na^+, Ba^{++}$ | $Cl^-$ | 4.7 | 0.25 |
| B | $Na^+, Zn^{++}$ | $Cl^-$ | 5.0 | 0.56 |
| B | $Na^+, Mn^{++}$ | $Cl^-$ | 3.5 | 0.38 |
| C | $Mg^{++}$ | $Cl^-$ | 4.1 | 0.24 |
| D | $Na^+$ | $SO_4^{--}$ | 2.0 | 0.26 |

NOTE.—
A = As in Example 1, with no counter-ions present.
B = As in Example 3, with variation of the divalent metal cation as shown.
C = As in Example 11, but using magnesium chloride as the added electrolyte. No acid was used.
D = As in Example 1, but using the amine sulphate, so that no chloride ions were present.

EXAMPLE 11

Preparation and effective capacity of an amphoteric resin based on acrylic acid and triallylamine, polymerized in the presence of potassium and propionate ions A resin was prepared from the free acid and free base forms of the monomers after addition of potassium propionate, and using propionic acid to adjust the acidity of the mixture.

Glacial acrylic acid (2.4 ml., 35 meq.) was mixed at ice temperatures with triallylamine (6.1 ml., 35 meq.). To the solution was added potassium propionate (1.3 g., 12 meq.) and water (2 ml.). After the addition of propionic acid (2.2 ml., 30 meq.) a clear solution of pH 6.4 was obtained. Following the usual vacuum degassing to remove oxygen, the solution was irradiated to a total dose of 10 mrad. from a $Co^{60}$ source. The opaque solid product was ground into 16–60 Tyler mesh particles and washed with alcohol, alkali, acid, and water as outlined in Example 1.

The resin particles were equilibrated in 1000 p.p.m. saline to a pH of 6.2, and after thermal regeneration its effective capacity measured as before. A value of 0.23 meq./g. was obtained.

EXAMPLE 12

Influence of the ratio of monomers

Resins were prepared as described in Example 1 with sodium, chloride, and sulphate ions present, but with either acrylic or methacrylic acid as the acid monomer. The mole ratio of acid monomer to triallylamine was varied, using a polymerization pH in the range 5.5 to 6.0. The effective capacities of the product resins are shown below.

| Acid monomer | Monomer mole ratio $RCO_2/TAA$ | Equilibration, pH | Effective capacity (ca. 20–80° C.) meq./g |
|---|---|---|---|
| AA | 1:1.0 | 6.2 | 0.24 |
| AA | 1:0.67 | 6.2 | 0.36 |
| AA | 1:0.50 | 6.2 | 0.24 |
| MAA | 1:2.5 | 7.4 | 0.02 |
| MAA | 1:2.0 | 7.4 | 0.46 |
| MAA | 1:1.5 | 7.4 | 0.31 |

EXAMPLE 13

Preparation and effective capacity of an amphoteric resin based on methacrylic acid and triallylamine, polymerized in the presence of sodium and valerate ions A resin was prepared from the free acid and free base forms of the monomers after the addition of valeric acid, plus sodium hydroxide to adjust the acidity of the solution.

Glacial methacrylic acid (3.7 ml., 44 meq.) was mixed at ice temperature with triallylamine (5.0 ml., 29 meq.), and valeric acid (4.2 ml., 44 meq.) and sodium hydroxide (1.5 ml. of 6 N solution, 9 meq.) added to give a clear solution of pH 5.5. After the usual vacuum degassing to remove oxygen the solution was irradiated to a total dose of 10 mrad. using a $Co^{60}$ source. The product was worked up as described in Example 1.

The effective capacity of the resin after equilibration in 1000 p.p.m. saline to a pH of 6.2, followed by thermal regeneration, was 0.39 meq./g.

I claim:

1. A method for producing an amphoteric, thermally-regenerable, ion-exchange resin, which comprises simultaneously polymerizing ethylenically unsaturated weakly acidic and basic monomers in a homogenous solvent system which contains counter-ions which associate with the anionic and cationic moieties of the monomers more strongly than such moieties associated with each other, said counter-ions being present in at least stoichiometric quantities with respect to the amounts of said moieties which are present in a charged state.

2. A method as claimed in claim 1, wherein the weakly basic monomer is a substituted amine.

3. A method as claimed in claim 2, wherein the amine is triallylamine.

4. A method as claimed in claim 1, wherein the said anionic moieties are derived from a carboxylic acid.

5. A method as claimed in claim 4, wherein the acid is acrylic or methacrylic acid.

6. A method as claimed in claim 1, wherein a cross-linking agent is added to the polymerizable monomers.

7. A method as claimed in claim 6, wherein the cross-linking agent is ethyleneglycol dimethacrylate or divinylbenzene.

8. A method as claimed in claim 1, wherein the solvent system comprises not less than 10% of water.

9. A method as claimed in claim 8, wherein the solvent system comprises from 20% to 80% of water.

10. A method as claimed in claim 1, wherein at least one of the counter ions is a simple inorganic ion.

11. A method as claimed in claim 10, wherein at least one of the said ions is a multivalent ion.

12. A method as claimed in claim 10, wherein at least one of the counter ions is $SO_4^{--}$, $Mg^{++}$, $Ca^{++}$, $Sr^{++}$, $Ba^{++}$, $Zn^{++}$ or $Mn^{++}$.

13. A method as claimed in claim 10, wherein at least one of the counter ions is the organic cation

or the anion of an aliphatic carboxylic acid having from 1 to 8 carbon atoms.

14. A method as claimed in claim 1, wherein the pH of the polymerization mixture is from 3.5 to 6.8.

15. A method as claimed in claim 1, wherein the ratio of the acidic to basic monomers is from 1:2 to 1:0.5.

16. A thermally-regenerable, ion-exchange resin formed by the simultaneous polymerization of at least one weakly basic ethylenically unsaturated monomer with at least one weakly acidic ethylenically unsaturated monomer in the presence of counter-ions which associate with the anionic and cationic moieties of the monomers more strongly than such moieties associated with each other, said counter-ions being present in at least stoichiometric quantities with respect to the amounts of said moieties which are present in a charged state, said resin having a thermally-regenerable ion-exchange capacity of at least 0.4 meq./gm. and a half-time for salt uptake of not more than 5 minutes.

17. A thermally-regenerable ion-exchange resin formed by the simultaneous polymerization of triallylamine and an unsaturated carboxylic acid monomer, selected from the group consisting of acrylic and methacrylic acids, in the presence of at least one cation selected from the class consisting of sodium, calcium, potassium and benzyltrimethyl ammonium and at least one anion selected from the class consisting of chloride, sulphate, persulphate and propionate.

18. A thermally-regenerable ion-exchange resin formed by the simultaneous polymerization of dimethylaminoethyl methacrylate, methacrylic acid and ethylene glycol dimethacrylate, in the presence of sodium, chloride and sulphate ions.

References Cited

UNITED STATES PATENTS 3,032,538    5/1962    Spaulding et al. _____ 260—80.3

MELVIN GOLDSTEIN, Primary Examiner

U.S. Cl. X.R.

260—80.3 N, 80.73

UNITED STATES PATENT OFFICE
CERTIFICATE OF CORRECTION

Patent No. 3,808,158          Dated April 30, 1974

Inventor(s) Brian Alfred Bolto

It is certified that error appears in the above-identified patent and that said Letters Patent are hereby corrected as shown below:

In the heading, the inventor's last name should be spelled --Bolto--; assignees' name should be inserted as --Commonwealth Scientific & Industrial Research Organization and ICI Australia Limited--. Column 8, line 24, "sulphite" should read -- sulphate --.

Signed and sealed this 19th day of November 1974.

(SEAL)
Attest:

McCOY M. GIBSON JR.
Attesting Officer

C. MARSHALL DANN
Commissioner of Patents